(12) United States Patent  
Someya et al.

(10) Patent No.: US 9,379,598 B2  
(45) Date of Patent: Jun. 28, 2016

(54) ABSOLUTE ENCODER DEVICE AND MOTOR

(75) Inventors: Masayuki Someya, Kashiwa (JP); Yoshio Hirasawa, Kashiwa (JP); Sakao Ozeki, Iwata (JP)

(73) Assignee: Oriental Motor Co., Ltd., Tokyo (JP)

( * ) Notice: Subject to any disclaimer, the term of this patent is extended or adjusted under 35 U.S.C. 154(b) by 283 days.

(21) Appl. No.: 14/001,924

(22) PCT Filed: Mar. 19, 2012

(86) PCT No.: PCT/JP2012/057005  
§ 371 (c)(1),  
(2), (4) Date: Aug. 28, 2013

(87) PCT Pub. No.: WO2012/132994  
PCT Pub. Date: Oct. 4, 2012

(65) Prior Publication Data  
US 2014/0015384 A1  Jan. 16, 2014

(30) Foreign Application Priority Data  
Mar. 31, 2011 (JP) ................. 2011-079530

(51) Int. Cl.  
*H02K 29/08* (2006.01)  
*H02K 11/00* (2016.01)  
(Continued)

(52) U.S. Cl.  
CPC .............. *H02K 11/0021* (2013.01); *G01B 7/30* (2013.01); *G01D 5/145* (2013.01); *G01D 5/2454* (2013.01); *H02K 11/215* (2016.01)

(58) Field of Classification Search  
CPC ....... G01B 7/30; G01D 5/2454; G01D 5/145; H02K 11/0021

USPC ..................... 324/207.25; 310/68 B  
See application file for complete search history.

(56) References Cited

U.S. PATENT DOCUMENTS 6,447,189 B1     9/2002 Omura  
2007/0257668 A1* 11/2007 Nakagawa .............. G01P 3/487  
                                                        324/207.22  
(Continued)

FOREIGN PATENT DOCUMENTS

EP      0443938 A2    8/1991  
JP      05-141911     6/1993  
(Continued)

OTHER PUBLICATIONS

Extended European Search Report corresponding to European Application No. 12763244.6 dated Jul. 25, 2014.

(Continued)

*Primary Examiner* — Melissa Koval  
*Assistant Examiner* — Courtney McDonnough  
(74) *Attorney, Agent, or Firm* — Myers Bigel & Sibley

(57) ABSTRACT

The present invention provides an absolute encoder device, including: a permanent magnet including a first magnetic pattern (bipolar) and a second magnetic pattern (multipolar); a first magnetic sensor for detecting a magnetic field of the first magnetic pattern; a second magnetic sensor for detecting a magnetic field of the second magnetic pattern; and a signal processing circuit for calculating an absolute rotation angle of a rotation shaft based on output signals of the first and second magnetic sensors. The first and second magnetic sensors and the signal processing circuit are fixed to a single substrate. The first magnetic pattern is formed on a plane extending in a direction crossing an axial direction inside the permanent magnet, and the second magnetic pattern is formed on an outer peripheral surface of the permanent magnet.

9 Claims, 14 Drawing Sheets

(51) Int. Cl.
  *G01D 5/14* (2006.01)
  *G01B 7/30* (2006.01)
  *G01D 5/245* (2006.01)

(56) References Cited

U.S. PATENT DOCUMENTS

| | | | |
|---|---|---|---|
| 2011/0025312 A1* | 2/2011 | Nagano | G01D 5/2497 324/207.25 |
| 2011/0156505 A1 | 6/2011 | Miyashita et al. | |

FOREIGN PATENT DOCUMENTS

| | | | | |
|---|---|---|---|---|
| JP | 6-10813 | 2/1994 | | |
| JP | 10-070325 | 3/1998 | | |
| JP | 2001-004405 | 1/2001 | | |
| JP | 2001-343206 | 12/2001 | | |
| JP | 2004-004028 | 1/2004 | | |
| JP | 2004-144497 | 5/2004 | | |
| JP | 2006-208025 | 8/2006 | | |
| JP | 2007113931 A | * | 5/2007 | ............ G01D 5/245 |
| JP | 2008-128740 | 6/2008 | | |
| WO | WO 00/40419 A1 | 7/2000 | | |
| WO | WO 2009/153839 A1 | 12/2009 | | |

OTHER PUBLICATIONS

International Search Report corresponding to International Application No. PCT/JP2012/057005 mailed May 1, 2012.

* cited by examiner

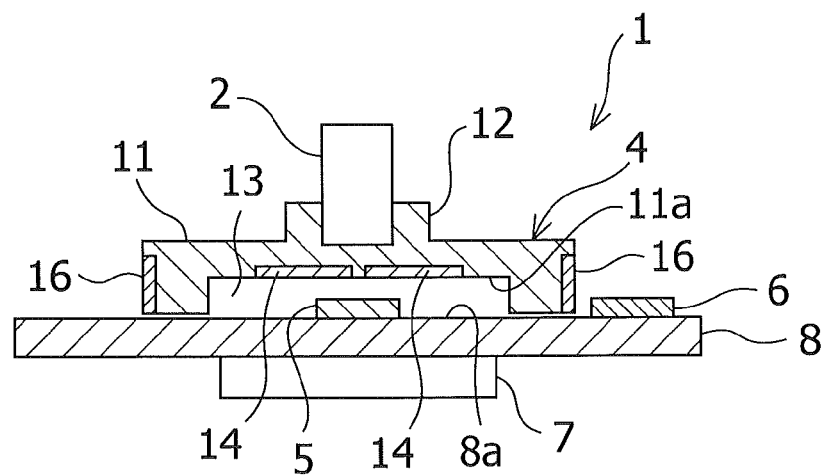
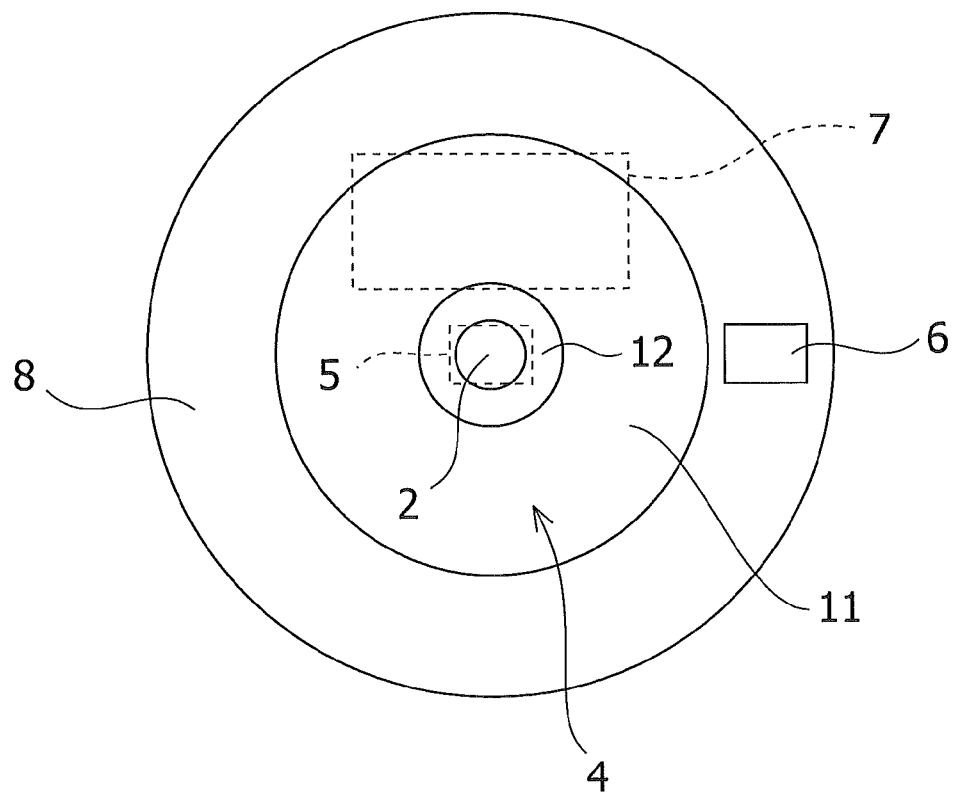

FIG.5(a)
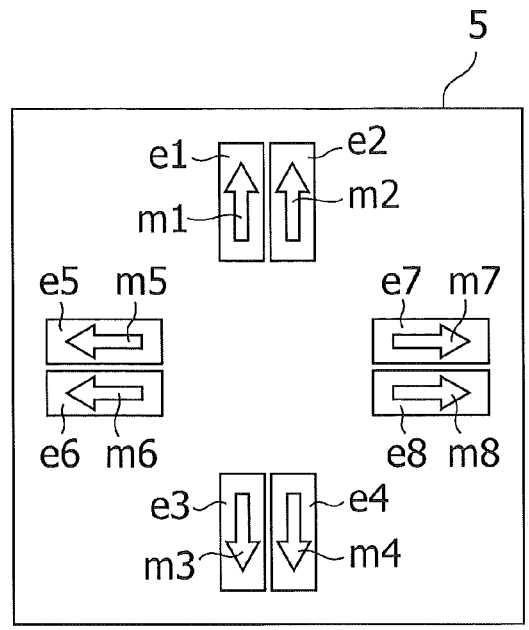
FIG.5(b)
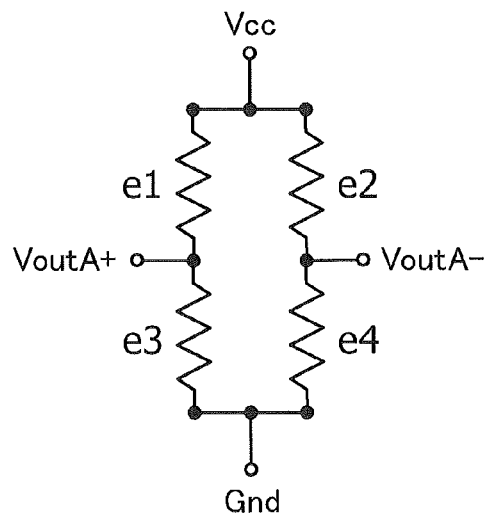
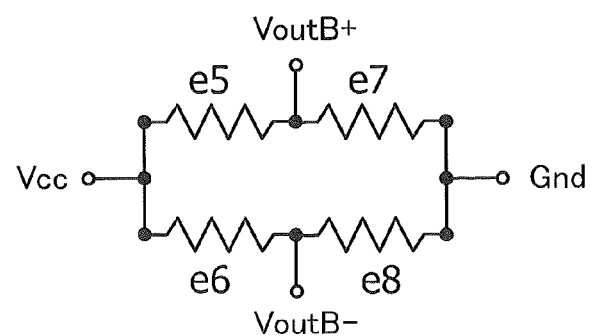

— OUTPUT A2 OF SECOND MAGNETIC SENSOR
— OUTPUT B2 OF SECOND MAGNETIC SENSOR

— OUTPUT A1 OF FIRST MAGNETIC SENSOR
— OUTPUT B1 OF FIRST MAGNETIC SENSOR

FIG.19(a)
FIG.19(b)
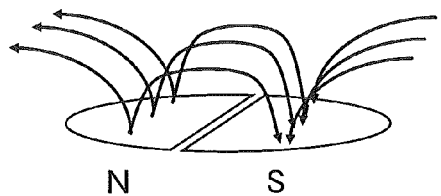
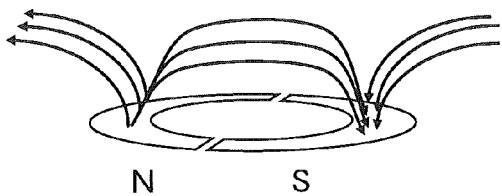
FIG.20(a)
FIG.20(b)
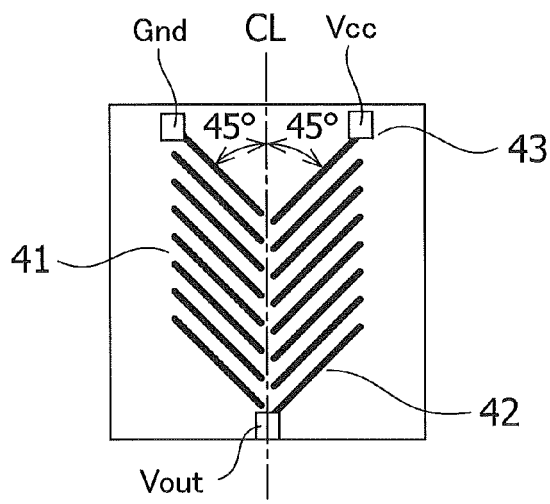
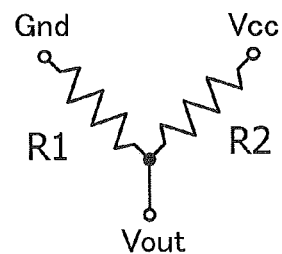
FIG.21
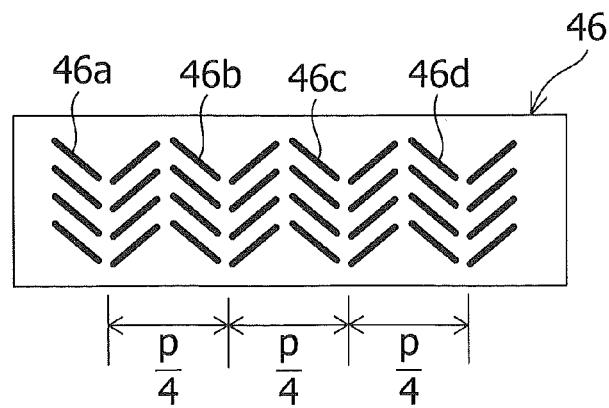

FIG.23(a)
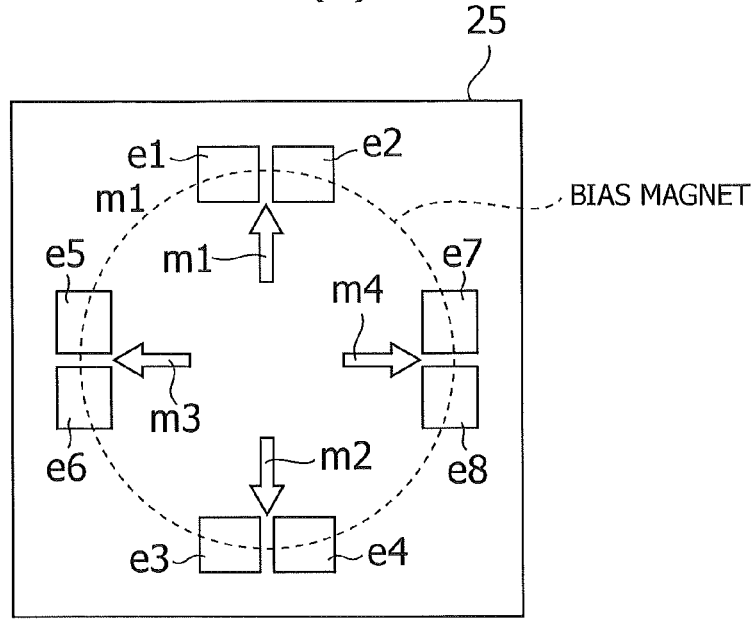
FIG.23(b)
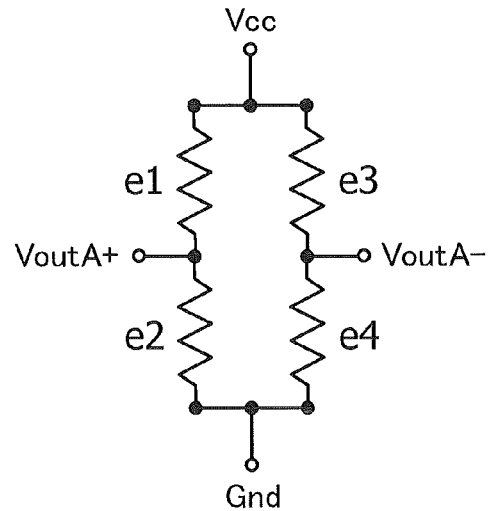
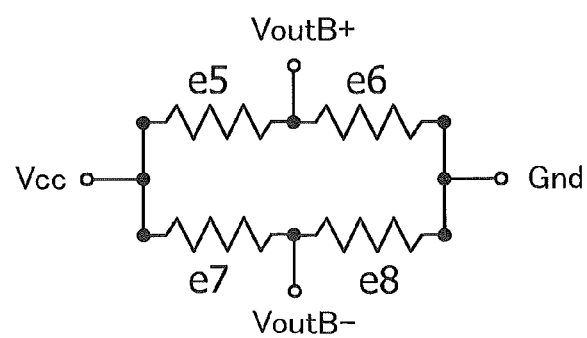

ABSOLUTE ENCODER DEVICE AND MOTOR

RELATED APPLICATIONS

This application is a 35 U.S.C. §371 national stage application of PCT Application No. PCT/JP2012/057005, filed on Mar. 19, 2012, which claims priority from Japanese Application No. 2011-079530, filed on Mar. 31, 2011, the contents of which are incorporated herein by reference in their entireties. The above-referenced PCT International Application was published as International Publication No. WO 2012/132994 A1 on Oct. 4, 2012.

TECHNICAL FIELD

The present invention relates to an absolute encoder device and a motor.

BACKGROUND ART

As a device for controlling rotation of a motor, there is known an absolute encoder device. The absolute encoder device can be used for, for example, detecting a rotation direction, a rotational frequency, or a rotational position of a motor. As this absolute encoder device, there are a magnetic type and an optical type. The magnetic type is less expensive than the optical type and is superior in environmental resistance.

In the magnetic type absolute encoder device, for example, a magnetic sensor is arranged to be opposed to a bipolar permanent magnet fixed to a rotation shaft. As the magnetic sensor, there is known a sensor using a spin-valve giant magnetoresistive element (SV-GMR) as a magnetoresistive element (for example, see Patent Literature 1). The SV-GMR type magnetic sensor includes a pinned layer and a free layer. A pinned layer magnetization direction is fixed, and a free layer magnetization direction changes in accordance with an external magnetic field direction. A resistance change in the free layer and the pinned layer produces outputs of sine wave signals having different phases when the rotation shaft rotates one turn. However, when the SV-GMR type magnetic sensor is used for detecting rotation, the free layer magnetization direction rotates in accordance with the external magnetic field. Therefore, it is not possible to completely saturate the magnetic field of the free layer without affecting a magnetization direction of the pinned layer that is used as a reference direction or coupling of layers (magnetostatic coupling or the like). Therefore, the operation is performed in the external magnetic field under a saturated magnetic field, and hence a resistance change ratio is limited.

In addition, as another magnetic sensor, there is known a sensor including a bias magnet for an anisotropic magnetoresistive element (AMR) as the magnetoresistive element (for example, see Patent Literature 2). This AMR type magnetic sensor uses a magnetic field of a stable permanent magnet as a magnetization direction in the reference direction and has a single layer, and therefore does not affect coupling of layers. However, there are such problems that the resistance change ratio is lower than that of the SV-GMR type magnetic sensor. Therefore, it is difficult to obtain high resolution and high accuracy regardless of the type of the magnetic sensor in the absolute encoder device using only the bipolar permanent magnet.

In view of this technical background, there is also known a device that aims to achieve higher resolution and higher accuracy of the encoder device not by the type of the sensor but by a configuration of the permanent magnet or the like (for example, see Patent Literatures 3 and 4). In the encoder device of Patent Literature 3, a rotational position detecting magnet (PG magnet) is arranged on an outer peripheral surface of a rotating substrate formed into a disc shape, and a magnetic pole position detecting magnet (pole magnet) is arranged on a top surface of the rotating substrate. In addition, in the encoder device of Patent Literature 4, a first track magnetized with a plurality of poles is formed on an outer peripheral surface of the disc-shaped rotator, and a second track magnetized with a single pole is formed on a lower surface of the disc-shaped rotator. In this way, in the devices of Patent Literatures 3 and 4, two types of magnetic patterns are combined so that higher resolution and higher accuracy can be obtained than in the absolute encoder device using only the bipolar permanent magnet.

However, in the device of Patent Literature 3, a substrate or a support member for supporting a position detecting element (MR element) for detecting a magnetic field from the rotational position magnet is necessary in addition to a substrate for supporting a magnetic pole position detecting element (Hall element) for detecting a magnetic field from the magnetic pole position detecting magnet. In addition, because the magnetic pole position detecting magnet that generates a strong magnetic field is arranged on a top surface of the rotating substrate, the magnetic field from the magnetic pole position detecting magnet affects the magnetic field of the rotational position magnet and the position detecting element for detecting a magnetic field from this magnet. As a solution to this problem, in Patent Literature 3, a magnetic shield plate as a separate member is arranged between the magnetic pole position detecting magnet and the rotational position magnet.

Also in the encoder device of Patent Literature 4, because the second track that generates a strong magnetic field is arranged on the lower surface of the disc-shaped rotator, a magnetic field from the second track affects a magnetic field of the first track and a magnetic detecting element for detecting the magnetic field from the first track. In addition, a support member for supporting the magnetic detecting element for detecting the magnetic field from the first track is necessary in addition to a substrate for supporting the magnetic detecting element for detecting the magnetic field from the second track.

In this way, in each of the devices of Patent Literatures 3 and 4, separate members are necessary to support the two magnetic sensors, and these separate members need to be assembled in consideration of a distance to the magnet and a distance between the sensors. Therefore, adjustment in assembling is necessary, and cost is increased. Further, because one of the magnetic patterns is formed on the outer peripheral surface of the disc-shaped rotator while the other magnetic pattern is formed on the top surface or the lower surface of the disc-shaped rotator, there is a problem of interference due to a leakage magnetic field between the magnetic patterns. In order to solve this problem, if the magnetic shield plate is arranged, the number of components is further increased, and hence difficulty in assembling and cost are increased.

In addition, in the device of Patent Literature 3, the magnetic pole position detecting element detects a power supply position to a driving coil of the motor by approximately a few pulses per rotation based on a magnetic field from the magnetic pole position detecting magnet. In the device of Patent Literature 4, the magnetic detecting element for detecting the magnetic field from the second track outputs one index signal, namely Z-phase signal, per rotation. In order for the devices of Patent Literatures 3 and 4 to function as absolute encoder devices using this output signal, it is necessary to perform a complicated calculation process of an incremental output signal obtained from the position detecting element (Patent Literature 3) for detecting the magnetic field from the rotational position magnet or from the magnetic detecting element (Patent Literature 4) for detecting the magnetic field from the first track. Therefore, it is necessary to arrange a separate component for this calculation process. For instance, in the device of Patent Literature 4, in order to keep necessary multiple rotation information in an absolute specification, a counter and a battery are arranged. In addition, the counter and the battery are necessary also for the device of Patent Literature 4 to function as the absolute encoder device for detecting an absolute position within one turn.

CITATION LIST

Patent Literature

Patent Literature 1: JP 10-70325 A
Patent Literature 2: JP 2006-208025 A
Patent Literature 3: JP 2001-4405 A
Patent Literature 4: JP 2004-144497 A

SUMMARY OF INVENTION

Technical Problem

In view of the above circumstances, it is an object of the present invention to provide an absolute encoder device and a motor, which can be readily assembled and can be realized at low cost while maintaining high resolution and high accuracy.

Solution to Problem

According to an aspect of the present invention, there is provided an absolute encoder device, including: a permanent magnet fixed to a rotation shaft, including a first magnetic pattern formed of two poles and a second magnetic pattern formed of a plurality of poles; a first magnetic sensor for detecting a magnetic field of the first magnetic pattern; a second magnetic sensor for detecting a magnetic field of the second magnetic pattern; a signal processing circuit for obtaining an absolute angle signal indicating an absolute angle position of the rotation shaft based on an output signal of the first magnetic sensor, obtaining a relative angle signal indicating a relative angle position of the rotation shaft based on an output signal of the second magnetic sensor, and calculating an absolute rotation angle of the rotation shaft based on the absolute angle signal and the relative angle signal; and a single substrate arranged to be opposed to the permanent magnet so as to fix the first magnetic sensor, the second magnetic sensor, and the signal processing circuit, in which the first magnetic pattern is formed to have different magnetic polarities along a rotation direction on a plane extending in a direction crossing an axial direction inside a recess formed in a surface of the permanent magnet opposed to the single substrate, and the second magnetic pattern is formed to have different magnetic polarities alternately along a circumferential direction on an outer peripheral surface of the permanent magnet. Further, in the description and the claims, "a plurality of poles" means four or more poles.

For example, the first magnetic sensor is configured to output signals having different phases in a period that permits an N pole and an S pole to be discriminated, the second magnetic sensor is configured to output signals having different phases in a period for not discriminating the N pole and the S pole, and a distance between the permanent magnet and the single substrate, and a thickness of the permanent magnet are selected in accordance with characteristics of the first magnetic sensor and the second magnetic sensor. As an example, the first magnetic sensor and the second magnetic sensor include a bridge circuit formed of a plurality of magnetoresistive elements. As another example, the first magnetic sensor is formed of a plurality of Hall elements.

The single substrate has a flash flat plane extending in one direction, and the first sensor and the second sensor may be mounted directly on the same flat plane, namely without intermediation of another support member between the substrate and the sensors.

As an example, the first magnetic pattern is formed into a circular shape, and the first magnetic sensor is arranged on an axis of the rotation shaft. As another example, the first magnetic pattern is formed into a ring shape, and the first magnetic sensor is arranged at a position offset from an axis of the rotation shaft. Further, in the description and the claims, a circular shape includes a substantially circular shape with a predetermined gap between an N-pole portion having a semi-circular shape and an S-pole portion having a semicircular shape. Similarly, a ring shape includes a substantially ring shape with a predetermined gap between an N-pole portion having a half-ring shape and an S-pole portion having a half-ring shape.

The permanent magnet may include a ring-shaped magnetic member arranged inside the permanent magnet. According to another aspect of the present invention, there is provided a motor including the above-mentioned absolute encoder device, and the rotation shaft is a drive mechanism of the motor.

Advantageous Effects of Invention

In the invention according to claim 1, the magnetic field of the first magnetic pattern formed of two poles and the magnetic field of the second magnetic pattern formed of a plurality of poles are detected, and the absolute angle signal obtained from the first magnetic pattern as well as the relative angle signal obtained from the second magnetic pattern are used for realizing higher resolution and higher accuracy of the encoder device. In addition, the first magnetic pattern is formed on the plane extending in the direction crossing the axial direction inside the recess of the permanent magnet, and the second magnetic pattern is formed on the outer peripheral surface of the permanent magnet. Therefore, the problem of interference due to the leakage magnetic field between the magnetic patterns is reduced, and hence it is not necessary to arrange another member such as a magnetic shield. Therefore, it is possible to facilitate the assembling and to reduce cost. In addition, in the invention according to claim 1, the first magnetic sensor, the second magnetic sensor, and the signal processing circuit are fixed to the single substrate. Therefore, it is possible to further contribute to facilitating assembling and to reducing cost than a case in which a plurality of substrates or another support member is used for supporting the first magnetic sensor, the second magnetic sensor, and the signal processing circuit. In this way, the invention according to claim 1 enables realization of the absolute encoder device that can be readily assembled and manufactured at low cost while maintaining high resolution and high accuracy.

In the invention according to claim 2, the first magnetic sensor outputs the signals having different phases in the period that permits the N pole and the S pole to be discriminated, and the second magnetic sensor outputs the signals having different phases in the period for not discriminating the N pole and the S pole. Therefore, the absolute angle signal can be obtained from the signals having different phases of the first magnetic sensor, and the relative angle signal can be obtained from the signals having different phases of the second magnetic sensor. Thus, the absolute rotation angle of the rotation shaft can be obtained without requiring a complicated calculation process. In addition, it is not necessary to arrange a separate component for the complicated calculation process, which can contribute also to reduction of the size and cost of the entire device.

Further, the distance between the permanent magnet and the single substrate, and the thickness of the permanent magnet can be selected in accordance with the characteristics of the first magnetic sensor and the second magnetic sensor. Therefore, without changing positions of fixing the first magnetic sensor and the second magnetic sensor on the single substrate, by adjusting the distance between the permanent magnet and the single substrate, by adjusting the thickness of the permanent magnet, or by adjusting both of them, it is possible to adjust a positional relationship between each sensor and the permanent magnet so as to obtain a magnetic field intensity suitable for each sensor. Thus, assembling work in a manufacturing process of the encoder device can be further facilitated.

In the invention according to claim 3, the first magnetic sensor and the second magnetic sensor are directly mounted on the same flat plane of the single substrate. Therefore, when the first and second magnetic sensors are fixed to the single substrate, mechanical assembling using, for example, a mounting machine (mounter) is possible, and hence the assembling can be further facilitated.

The invention according to claim 4 can be applied to an absolute encoder device having a structure in which the permanent magnet is fixed to a distal end of the rotation shaft. The invention according to claim 5 can be applied to an absolute encoder device having a structure of a rotation shaft penetrating type.

The invention according to claim 6 can realize a structure that is resistant to an external floating magnetic field. The invention according to claim 7 can realize a motor with an absolute encoder device to which the inventions according to claims 1 to 6 are applied.

BRIEF DESCRIPTION OF DRAWINGS

FIG. 1 is a cross-sectional view of an absolute encoder device according to a first embodiment of the present invention.

FIG. 2 is a plan view of the absolute encoder device illustrated in FIG. 1.

FIG. 5(a) is a structural diagram of a first magnetic sensor according to the first embodiment. FIG. 5(b) is an equivalent circuit diagram of the structure illustrated in FIG. 5(a).

FIG. 19(a) is a perspective view illustrating a magnetic field in a case in which the first magnetic pattern has a circular shape. FIG. 19(b) is a perspective view illustrating a magnetic field in a case in which a second magnetic pattern has a ring shape.

FIG. 20(a) is a structural diagram of an element of a second magnetic sensor according to another embodiment of the present invention. FIG. 20(b) is an equivalent circuit diagram of the structure illustrated in FIG. 20(a).

FIG. 21 is a structural diagram of a second magnetic sensor according to another embodiment.

FIG. 23(a) is a structural diagram of a first magnetic sensor according to yet another embodiment of the present invention. FIG. 23(b) is an equivalent circuit diagram of the structure illustrated in FIG. 23(a).

DESCRIPTION OF EMBODIMENTS

First Embodiment

Figure 3A:
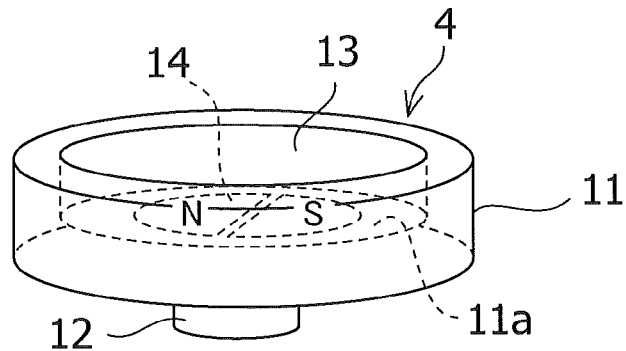
FIG. 3(a) is a perspective view of a permanent magnet, for illustrating a first magnetic pattern according to the first embodiment.

Now, embodiments of the present invention are described with reference to the attached drawings. FIG. 1 is a cross-sectional view of an absolute encoder device according to a first embodiment of the present invention, and FIG. 2 is a plan view of the encoder device illustrated in FIG. 1 as viewed from above. An encoder device 1 includes a permanent magnet 4 fixed to a rotation shaft 2, and a substrate 8 for supporting a first magnetic sensor 5, a second magnetic sensor 6, and a signal processing circuit 7. The permanent magnet 4 includes a disc-like main body part 11 having a cup shape with an elongated protrusion formed along a peripheral rim on a lower side, and a rotation shaft fixing portion 12 protruding from a center part of a top surface of the main body part 11 toward the rotation shaft 2 with a step part. In this embodiment, a distal end of the rotation shaft 2 is inserted into a recess formed in a center axis of the rotation shaft fixing portion 12 of the permanent magnet 4 and is contact-bonded or adhered, and hence the permanent magnet 4 is fixed to the rotation shaft 2.

The substrate 8 is a single substrate and is a substrate having a plane 8a extending in one direction to be flat. The first and second magnetic sensors 5 and 6 are fixed on the same plane 8a of the substrate 8. As illustrated in FIG. 1, the substrate 8 is arranged to be opposed to a lower surface of the permanent magnet 4 so as to cover a cup-shaped recess 13 of the permanent magnet main body part 11.

On an inner top surface 11a of the main body part 11 of the permanent magnet 4, there is formed a first magnetic pattern 14 along a rotation direction of the rotation shaft toward the lower surface. On an outer peripheral surface of the main body part 11, there is formed a second magnetic pattern 16 along a circumferential direction. The first magnetic sensor 5 is arranged on one plane 8a of the substrate 8 to be opposed to the first magnetic pattern 14 so as to detect a magnetic field from the first magnetic pattern 14. The second magnetic sensor 6 is arranged on the one plane 8a of the substrate 8 with a predetermined space on the outer periphery side of the permanent magnet 4 to be opposed to the second magnetic pattern 16 so as to detect a magnetic field from the second magnetic pattern 16. On the other plane of the substrate 8, the signal processing circuit 7 is fixed.

Figure 3B:
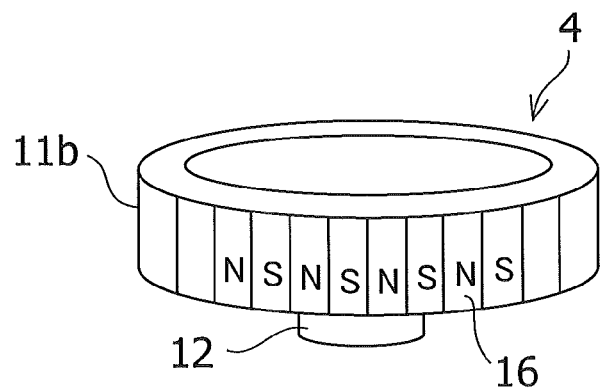
FIG. 3(b) is a perspective view of the permanent magnet, for illustrating a second magnetic pattern according to the first embodiment.

FIG. 3 is a perspective view of the permanent magnet 4. For the sake of description, FIG. 3(a) illustrates only the first magnetic pattern 14, and FIG. 3(b) illustrates only the second magnetic pattern 16. The main body part 11 of the permanent magnet 4 has a cup shape in which the recess 13 is formed inside the disc lower surface in a positional relationship illustrated in FIG. 1. On the surface 11a extending in a direction crossing an axial direction inside the permanent magnet 4 (the inner top surface 11a of the recess opposed to the substrate 8 in the positional relationship illustrated in FIG. 1, namely the inner bottom surface 11a of the cup shape in the positional relationship illustrated in FIG. 3(a)), the first magnetic pattern 14 made of two poles along the rotation direction is formed (see FIG. 3(a)). On an outer peripheral surface 11b, the second magnetic pattern 16 made of a plurality of poles in which N-poles and S-poles are successively magnetized alternately along the circumferential direction is formed (see FIG. 3(b)). In this embodiment, the permanent magnet 4 is made of a resin magnet. Therefore, the cup shape of the main body part 11 and the structure of the rotation shaft fixing portion 12 can be easily formed. The first magnetic pattern 14 and the second magnetic pattern 16 are formed by surface magnetization. The surface magnetization means a method of magnetizing by setting a yoke to be close to only the surface to be magnetized.

Figure 4:
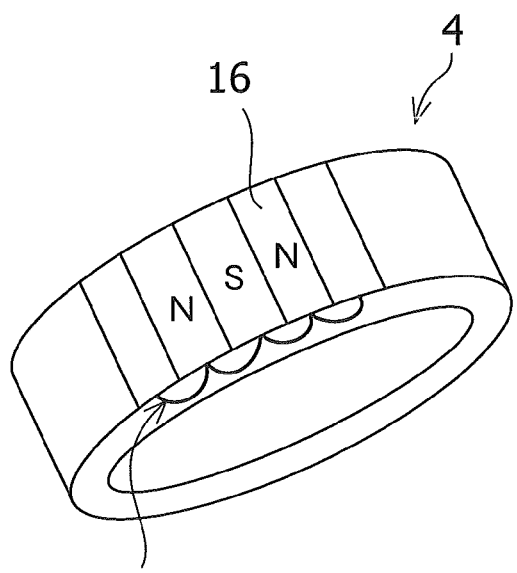
FIG. 4 is a perspective view of the permanent magnet, for illustrating a demagnetizing field inside the magnet.

The second magnetic pattern 16 is formed by magnetizing a plurality of poles including S-poles and N-poles alternately in the circumferential direction on the outer peripheral surface 11b of the main body part of the permanent magnet 4. The magnetizing method of this embodiment is performed not by double sided magnetization in which both sides are magnetized but by the surface magnetization in which only one side is magnetized. In other words, the surface magnetization is performed only on the outer peripheral surface 11b of the main body part, and the inner peripheral surface of the main body part defining a side surface of the recess 13 is not magnetized. By the surface magnetization only on the outer peripheral surface 11b of the main body part, a magnetic field is generated only from the outer peripheral surface 11b of the main body part, and no magnetic field is generated from the inner peripheral surface of the main body part. In addition, a magnetic field from the second magnetic pattern 16 formed by surface magnetization on the outer peripheral surface 11b of the main body part hardly leaks to the recess 13 of the main body part 11. As to this point, a demagnetizing field inside the resin magnet generated by the surface magnetization on the outer peripheral surface 11b of the main body part is indicated by a curve in FIG. 4. Because the demagnetizing field of the second magnetic pattern 16 is generated inside the permanent magnet 4 as illustrated in FIG. 4, it is possible to reduce leakage of the magnetic field of the second magnetic pattern 16 magnetized on the outer peripheral surface 11b to inside of the cup shape of the main body part 11. In addition, the first magnetic pattern 14 is formed by the surface magnetization not on the lower surface or the top surface of the permanent magnet 4 but on the surface 11a extending in the direction crossing the axial direction inside of the recess 13 formed in the permanent magnet 4. This surface magnetization is, similarly to the surface magnetization of the second magnetic pattern 16, the surface magnetization for magnetizing only one side, and the first magnetic pattern 14 is magnetized only on the surface 11a. Therefore, a leakage magnetic field from the first magnetic pattern 14 to outside of the main body part 11 is reduced. Therefore, in this structure, the leakage magnetic field of the first magnetic pattern 14 does not interfere with the second magnetic sensor 6, and a leakage magnetic field of the second magnetic pattern 16 does not interfere with the first magnetic sensor 5.

A thickness of the permanent magnet 4 can be adjusted in accordance with characteristics of the first and second magnetic sensors 5 and 6. For instance, if the first magnetic sensor 5 needs a stronger magnetic force, the thickness of the permanent magnet 4 is reduced so that a distance between the first magnetic sensor 5 and the first magnetic pattern 14 formed inside the recess of the permanent magnet 4 can be reduced. If the second magnetic sensor 6 needs a stronger magnetic force, the thickness of the permanent magnet 4 is increased so that a magnetized area of the second magnetic pattern 16 on the permanent magnet 4 can be increased.

Next, the magnetic sensors 5 and 6 are described. The first magnetic sensor 5 is a magnetic sensor that outputs signals having different phases in a period that permits the N and S poles to be discriminated. In this embodiment, as an example, an SV-GMR type magnetic sensor is used for the first magnetic sensor 5. FIG. 5(*a*) is a structural diagram illustrating magnetic sensing surface areas (e1 to e8) of the SV-GMR constituting the first magnetic sensor 5 and magnetization directions (m1 to m8) indicating a pinned layer, and FIG. 5(*b*) is a diagram illustrating an equivalent circuit of this structure. A group formed of the magnetic sensing surface areas e1 and e2, a group formed of the magnetic sensing surface areas e5 and e6, a group formed of the magnetic sensing surface areas e3 and e4, and a group formed of the magnetic sensing surface areas e7 and e8 are arranged on the same circumference at an interval of 90 degrees as illustrated in FIG. 5(*a*).

A resistance change of the magnetic sensing surface areas is determined by Equation (1):

$$R = R0 - \Delta R \cos(\theta - \theta\text{pin}) \quad (1),$$

where R0 represents a resistance when no external magnetic field is applied to the SV-GMR, ΔR represents a resistance change, θ represents a magnetization direction of the external magnetic field (magnetic field direction of a free layer), and θpin represents a magnetization direction of the pinned layer.

By arranging a magnetic sensing area having the resistance change of Equation (1) as illustrated in FIG. 5(*a*), the N and S poles can be discriminated in the same period as the magnetic field period, and the signals having different phases can be obtained.

Figure 6A:
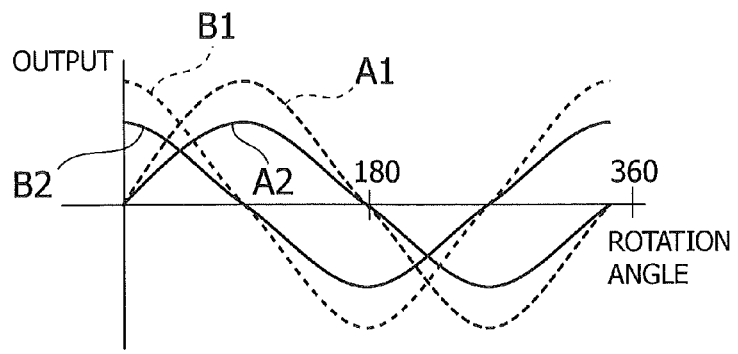
FIG. 6(a) is a waveform diagram illustrating an output signal of the first magnetic sensor with respect to a rotation angle.
Figure 6B:
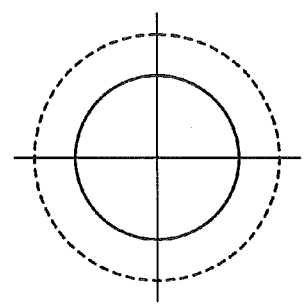
FIG. 6(b) is a Lissajou's figure of the output signal of the first magnetic sensor.
Figure 6C:
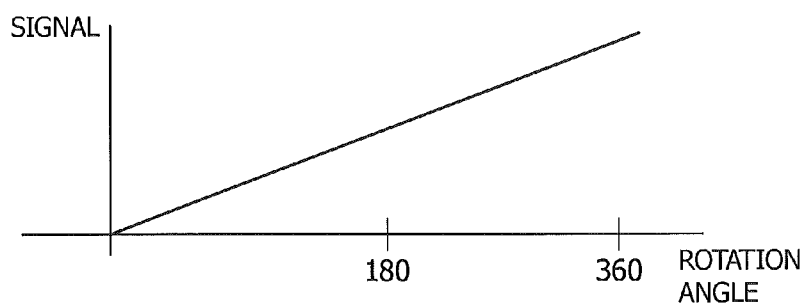
FIG. 6(c) is a graph showing an angle value obtained by an arctangent operation of the output signal of the first magnetic sensor.

This first magnetic sensor 5 detects a magnetic field of the first magnetic pattern 14 and outputs one period of two-phase sine wave signals having different phases by 90 degrees for one turn. This output becomes an absolute angle signal (absolute signal) without needing a complicated calculation process. The first magnetic sensor 5 has output characteristics in accordance with intensity of the external magnetic field as illustrated in FIG. 6. FIG. 6(*a*) shows an output of the first magnetic sensor 5 with respect to the rotation angle, FIG. 6(*b*) shows a Lissajou's figure of the output of the first magnetic sensor 5, and FIG. 6(*c*) shows an absolute angle signal obtained by converting position information obtained from the first magnetic sensor 5 into an angle by an arctangent operation (Arctan). FIGS. 6(*a*) and 6(*b*) show by a dotted line the output signal when the first magnetic sensor 5 and the first magnetic pattern 14 are close to each other and show by a solid line the output signal when the first magnetic sensor 5 and the first magnetic pattern 14 are apart from each other. When the first magnetic sensor 5 and the permanent magnet 4 are close to each other, intensity of a magnetic field applied to the first magnetic sensor 5 is increased, and peak to peak output voltages (A1 and B1) of the two-phase sine wave signals are increased simultaneously. When the first magnetic sensor 5 and the permanent magnet 4 are apart from each other, peak to peak output voltages (A2 and B2) of the two-phase sine wave signals are decreased simultaneously. Therefore, as shown in FIG. 6(*c*), even if the rotation shaft 2 is shifted in the rotation shaft direction, the absolute angle signal obtained by the calculation process such as the arctangent operation (Arctan) is not affected.

Figure 7A:
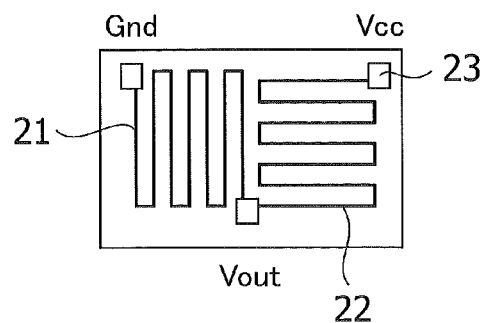
FIG. 7(a) is a structural diagram of an element constituting the second magnetic sensor.
Figure 7B:
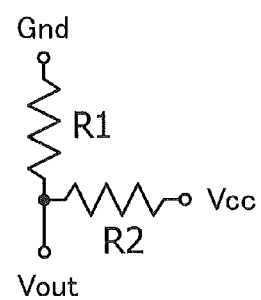
FIG. 7(b) is an equivalent circuit diagram of the structure illustrated in FIG. 7(a).

Next, the second magnetic sensor 6 is described. FIG. 7(*a*) is a structural diagram of an element constituting the second magnetic sensor 6, and FIG. 7(*b*) is an equivalent circuit diagram of the structure illustrated in FIG. 7(*a*). The second magnetic sensor 6 includes a plurality of elements illustrated in FIG. 7(*a*) as described later. The element is formed of a magnetoresistive element 21 having a resistance of R1 and formed in a vertical grid shape and a magnetoresistive element 22 having a resistance of R2 and formed in a horizontal grid shape, which are connected in series. An end of the magnetoresistive element 22 is connected to an electrode 23.

In this way, because the extending direction of the magnetoresistive element 22 is substantially perpendicular to the extending direction of the magnetoresistive element 21, a vertical magnetic field that gives a largest resistance change to the magnetoresistive element 21 becomes a magnetic field that gives a smallest resistance change to the magnetoresistive element 22. Here, the resistance values R1 and R2 of the magnetoresistive elements 21 and 22 are given by the following equations.

$$R1 = R0 - \Delta R \sin^2 \theta \quad (2)$$

$$R2 = R0 - \Delta R \cos^2 \theta \quad (3)$$

An output voltage Vout from the equivalent circuit is given by the following equation.

[Equation 1]

$$Vout = \frac{R1}{R1 + R2} \cdot Vcc \quad (4)$$

Substituting Equations (2) and (3) into Equation (4) and rearranging the equation, Equation (5) is satisfied.

[Equation 2]

$$Vout = \frac{R1}{R1 + R2} \cdot Vcc \quad (5)$$

$$= \frac{R0 - \Delta R \sin^2 \theta}{2R0 - \Delta R} \cdot Vcc$$

$$= \frac{Vcc}{2} + \alpha \cos 2\theta$$

$$\left( \alpha = \frac{\Delta R}{2(2R0 - \Delta R)} \cdot Vcc \right)$$

Figure 8:
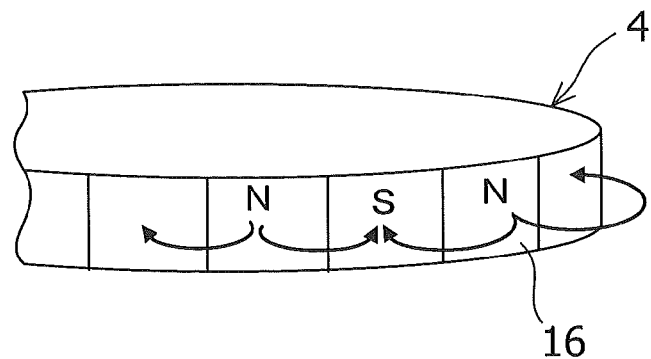
FIG. 8 is a perspective view of the permanent magnet, for illustrating a magnetic field detected by the second magnetic sensor.
Figure 9A:
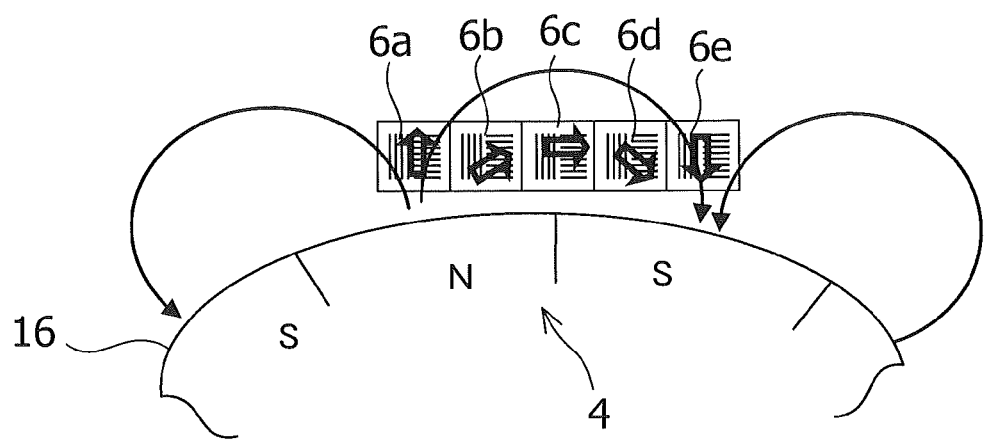
FIG. 9(a) is a plan view of the permanent magnet, for illustrating a detection principle of the second magnetic sensor.
Figure 9B:
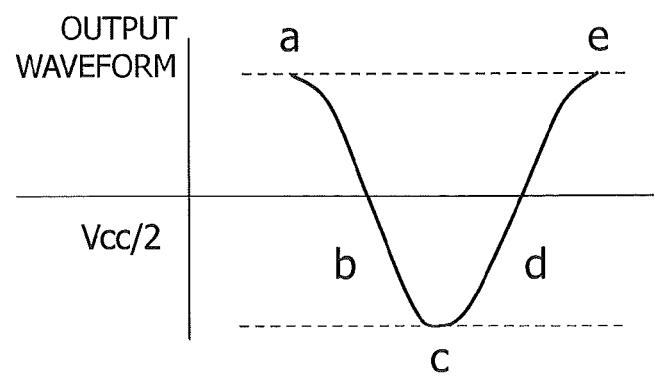
FIG. 9(b) is a waveform diagram illustrating an output signal of each element illustrated in FIG. 9(a).

The magnetic field detected by the second magnetic sensor 6 is illustrated by an arrow in FIG. 8. In FIG. 8, a magnetic field emitted outside from the second magnetic pattern 16 formed on the permanent magnet 4 is illustrated by an arrow. FIG. 9(*a*) illustrates a relationship between the second magnetic pattern 16 and the magnetic field illustrated in FIG. 8 as viewed from the top surface of the permanent magnet 4. In order to describe a detection principle of the second magnetic sensor 6, five elements (6*a* to 6*e*), which are each illustrated in FIG. 7(*a*), are arranged and illustrated together with the permanent magnet 4. In FIG. 9(*a*), a thin arrow extending from the second magnetic pattern 16 in a circular arc shape indicates the magnetic field emitted outside from the second magnetic pattern illustrated in FIG. 8, and a thick arrow illustrated on each of the elements 6*a* to 6*e* indicates a magnetic field applied to each of the elements 6*a* to 6*e*.

The elements 6*a* to 6*e* are arranged in a lateral line along the second magnetic pattern 16 as illustrated in FIG. 9(*a*). It is supposed that a position of the element 6*a* is denoted by a, a position of the element 6*b* is denoted by b, a position of the element 6*c* is denoted by c, a position of the element 6*d* is denoted by d, a position of the element 6*e* is denoted by e, and one pitch of the magnetic pattern is denoted by P. Then, distances between the position a and the positions b, c, d, and e are P/4, P/2, 3P/4, and 4P/4, respectively. Assuming that the permanent magnet 4 rotates to the left in FIG. 9(*a*), output signals of the respective elements 6*a* to 6*e* are outputs of one period per pitch of the magnetic pattern. In the positional relationship among the elements 6*a* to 6*e* and the second magnetic pattern 16 illustrated in FIG. 9(*a*), signal waveforms respectively output from the elements 6*a* to 6*e* are illustrated in FIG. 9(*b*) (note that, a waveform of only one of the two-phase output signals output from the elements 6*a* to 6*e* is illustrated for description).

Figure 10:
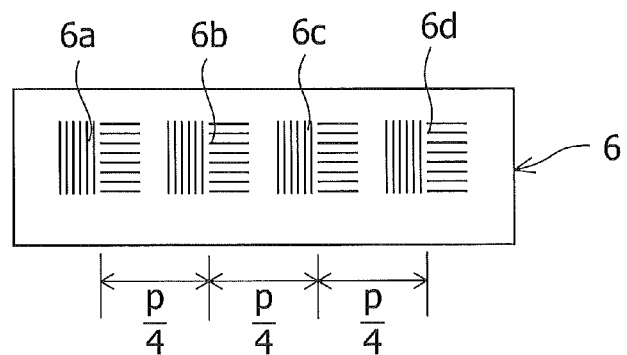
FIG. 10 is a structural diagram of the second magnetic sensor according to the first embodiment.

Therefore, as illustrated in FIG. 10, by setting the second magnetic sensor 6 to be a magnetic sensor including four elements 6*a* to 6*d* respectively arranged at the positions a to d, it is possible to obtain a cosine wave signal from the element 6*a*, a negative sine wave signal from the element 6*b*, a negative cosine wave signal from the element 6*c*, and a sine wave signal from the element 6*d*. As described above with reference to FIG. 7(*a*), each of the elements 6*a* to 6*d* is formed of the two magnetoresistive elements having extending directions different from each other by approximately 90 degrees. Therefore, when the second magnetic pattern 16 rotates, the second magnetic sensor 6 outputs two-phase sine wave signals having different phases by 90 degrees in a period for not discriminating N and S poles.

Figures 11A, 11B:
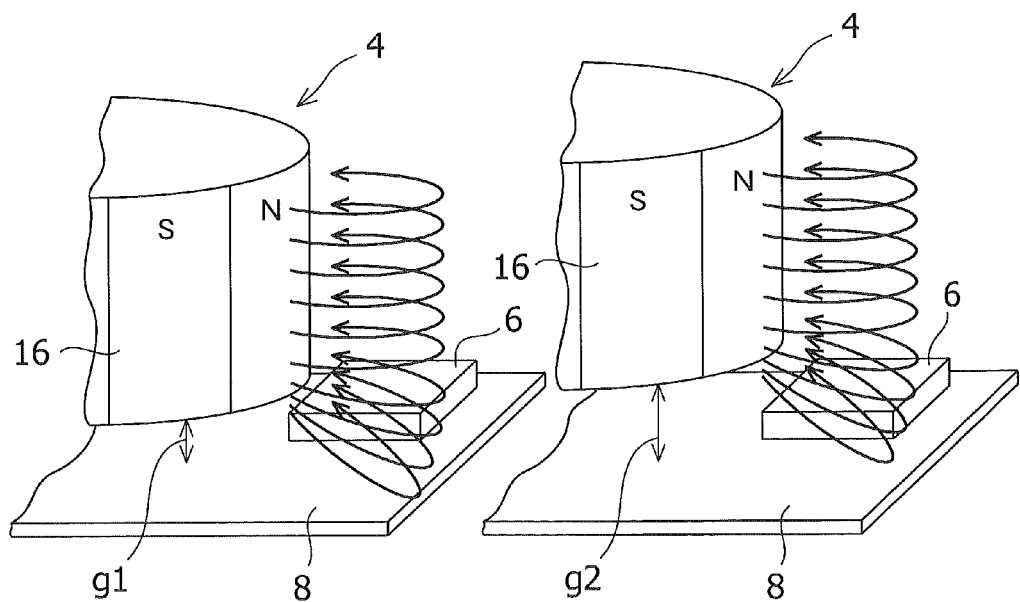
FIG. 11(a) is a perspective view of the absolute encoder device, for illustrating a positional relationship between a magnetic field from the second magnetic pattern and the second magnetic sensor.
FIG. 11(b) is a perspective view of the absolute encoder device, for illustrating a positional relationship between the magnetic field from the second magnetic pattern and the second magnetic sensor in a case in which a permanent magnet illustrated in FIG. 11(a) is shifted in an axial direction of a rotation shaft.

Next, a positional relationship between the second magnetic sensor 6 and the second magnetic pattern 16 is described. FIG. 11 illustrate a positional relationship between the permanent magnet 4 and the second magnetic sensor 6 as viewed from a side surface of the encoder device 1. Because the permanent magnet 4 rotates together with the rotation shaft 2, a distance to the substrate 8 for supporting the second sensor 6 may be changed. For instance, a case is assumed in which the permanent magnet 4 having a distance g1 to the substrate 8 in FIG. 11(*a*) is shifted in the direction separating from the substrate 8 so as to move to a position having a distance g2 larger than the distance g1 to the substrate 8 as illustrated in FIG. 11(*b*). In this case, because the substrate 8 supports the magnetic sensor 6, a distance between the permanent magnet 4 and the magnetic sensor 6 changes. However, because the magnetic field from the second magnetic pattern 16 is generated downward except for the vertical direction as illustrated in FIGS. 11(*a*) and 11(*b*), the change of the distance between the permanent magnet 4 and the magnetic sensor 6 does not affect so much the output of the second magnetic sensor 6.

In addition, the distance between the permanent magnet 4 and the substrate 8 can be adjusted in accordance with characteristics of the first and second magnetic sensors 5 and 6. For instance, if the first magnetic sensors 5 and 6 need a stronger magnetic force, the distance between the permanent magnet 4 and the substrate 8 only needs to be set to be short.

In this embodiment, the first magnetic sensors 5 and 6 are mounted mechanically on the same plane 8*a* of the substrate 8 by a mounting machine (mounter) (see FIG. 1). When the first magnetic sensors 5 and 6 are mounted, another support member is not necessary between the substrate 8 and the first magnetic sensors 5 and 6.

Figure 12:
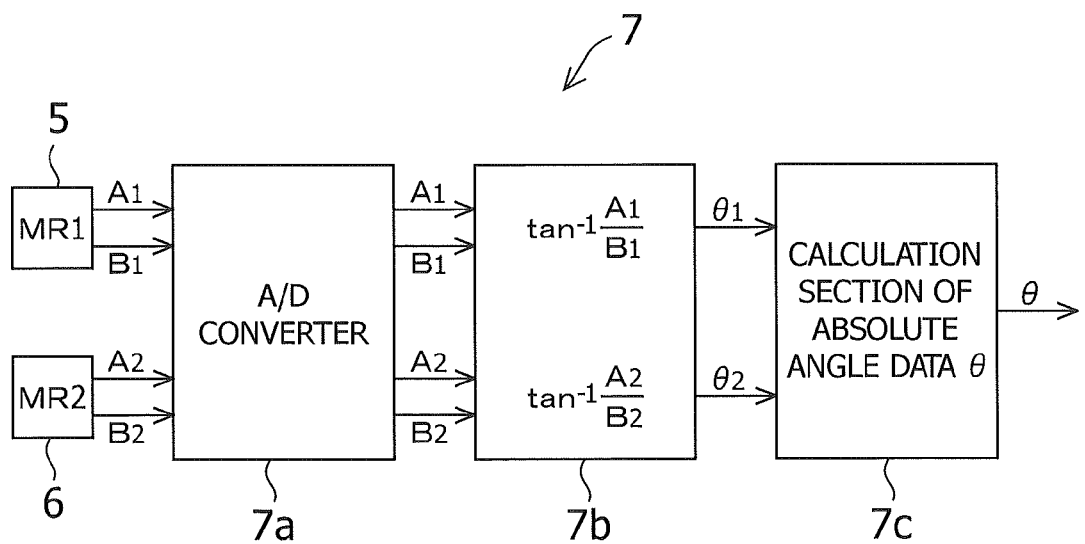
FIG. 12 is a block diagram of a signal processing circuit according to the first embodiment.
Figure 13A:
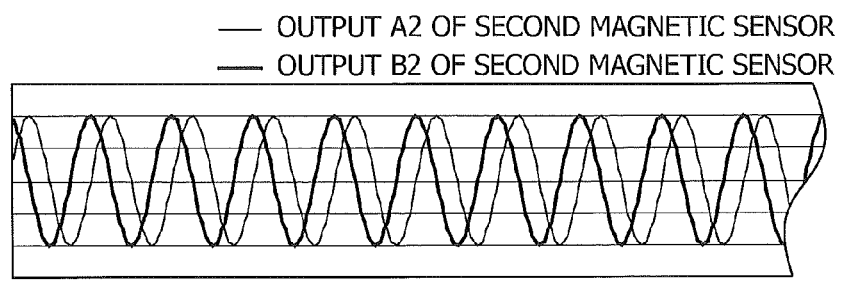
FIG. 13(a) is a waveform diagram illustrating an output signal from the second magnetic sensor.
Figure 13B:
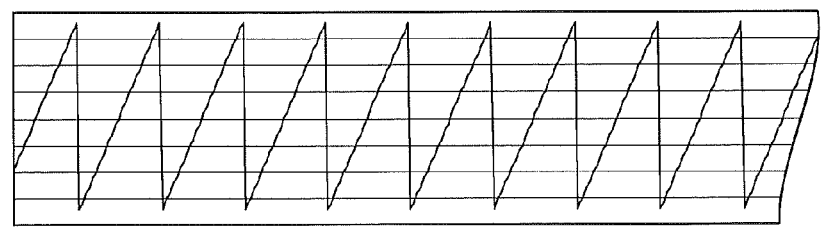
FIG. 13(b) is a waveform diagram illustrating a relative angle signal obtained from the output signal illustrated in FIG. 13(a).
Figure 13C:
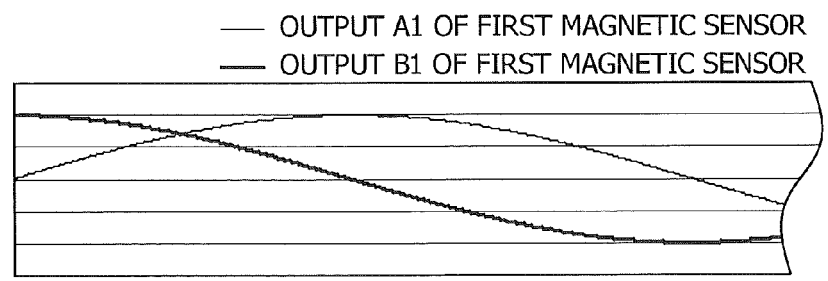
FIG. 13(c) is a waveform diagram illustrating an output signal from the first magnetic sensor.
Figure 13D:
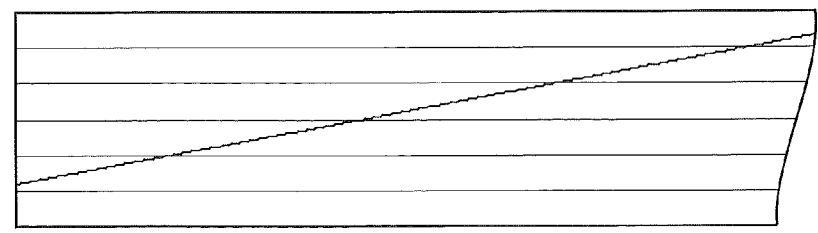
FIG. 13(d) is a waveform diagram illustrating an absolute angle signal obtained from the output signal illustrated in FIG. 13(c).

Next, the signal processing circuit 7 is described. In order to measure a fine interval (angle) within one turn, it is necessary to use a phase change of the sine wave signals output from the magnetic sensors 5 and 6 so as to perform an interpolation process for making a space period thereof to be finer. The configuration of the signal processing circuit 7 for performing the interpolation process is illustrated in FIG. 12. The signal processing circuit 7 is realized by using a CPU, for example. The signal processing circuit 7 is supplied with the output of the first magnetic sensor 5 and the output of the second magnetic sensor 6. FIG. 13(*a*) illustrates waveforms of the outputs A2 and B2 of the second magnetic sensor 6, and FIG. 13(*c*) illustrates the outputs A1 and B1 from the first magnetic sensor 5. A-phase and B-phase signals having a phase of 90 degrees illustrated in FIGS. 13(*a*) and 13(*c*) are each sampled in a predetermined period and are converted into digital signals by an A/D converter 7*a* of the signal processing circuit 7. In this embodiment, 10-bit ($2^{10}$) A/D conversion is performed, for example.

Figure 14:
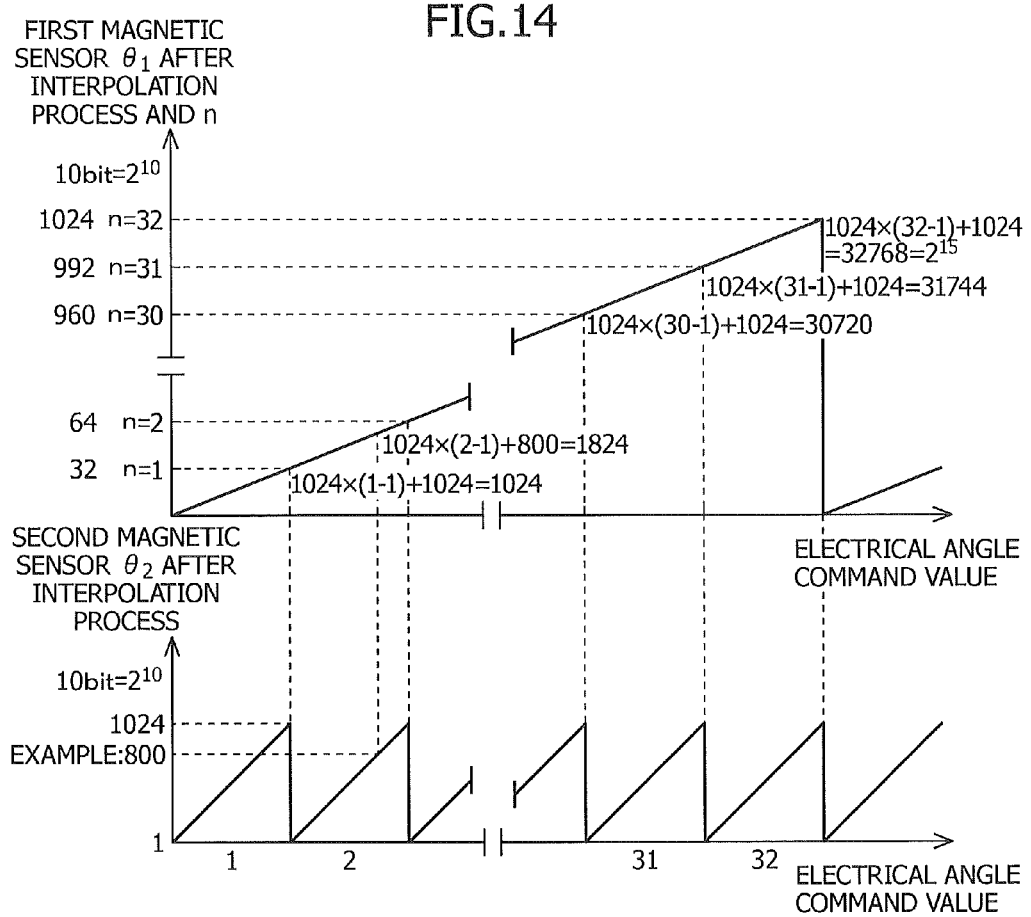
FIG. 14 is a waveform diagram illustrating a relationship between angle data $\theta 1$ and angle data $\theta 2$.

An arctangent operation section 7*b* performs an arctangent operation (arctan) of the obtained digital signal so as to calculate angle data θ1 based on the output from the first sensor 5 and angle data θ2 based on the output from the second sensor 6. An output signal waveform of the angle data θ2 is illustrated in FIG. 13(*b*), and an output waveform signal of the angle data θ1 is illustrated in FIG. 13(*d*). An absolute angle calculating section 7*c* calculates an absolute rotation angle of the rotation shaft 2 based on the angle data θ1 and the angle data θ2 so as to calculate absolute angle data θ. A relationship between the angle data θ1 and the angle data θ2 is shown in FIG. 14. If the second magnetic pattern 16 has 32 poles ($2^5$ poles), an output of 32 periods is obtained from the second magnetic sensor 6 for an output of one period from the first magnetic sensor 5 as shown in FIG. 14. In this embodiment, because a 10-bit interpolation process is performed, one period of the angle data θ2 corresponds to 1,024 bits. Therefore, the absolute angle data θ can be calculated from Equation (6):

$$\theta = 1024 \times (n-1) + \theta 2 \tag{6},$$

where n represents a period of the output signal from the second magnetic sensor 6. Note that the period n indicates an order of the period of the output signal from the second magnetic sensor 6. In this embodiment, n is an integer from 1 to 32. For instance, if the angle data θ2 is a second period value of 800 as shown in FIG. 14, a value of 1,824 is obtained by the calculation of 1024×(2−1)+800. The period n of the angle data θ2 can be calculated based on a value obtained by dividing the first magnetic sensor angle, namely the angle data θ1 by 32. In this way, the 10-bit interpolation process is performed by using the second magnetic pattern 16 of 32 poles ($2^5$ poles) in this embodiment, and hence the absolute angle signals of $2^5 \times 2^{10} 2^{15}$ can be obtained.

As described above, the absolute encoder device 1 of this embodiment detects the magnetic field of the first magnetic pattern 14 formed of the two poles and the magnetic field of the second magnetic pattern 16 formed of the plurality of poles, so as to use the absolute angle signal obtained from the first magnetic pattern 14 as well as the relative angle signal obtained from the second magnetic pattern 16. Thus, high resolution is realized, and the encoder device has high accuracy as a whole.

Further, because the first and second magnetic sensors 5 and 6 and the signal processing circuit 7 are fixed to the single substrate 8, compared with a case in which a plurality of substrates or another support member is used for supporting the magnetic sensors 5 and 6 and the signal processing circuit 7, the device can be readily assembled, and cost can be reduced. In addition, the permanent magnet 4 has a cup shape, the first magnetic pattern 14 is formed inside the permanent magnet 4, and the second magnetic pattern 16 is formed on the outer peripheral surface of the permanent magnet 4. Therefore, the problem of interference between the magnetic patterns due to the leakage magnetic field is reduced without needing to arrange another member such as a magnetic shield. Therefore, the assembling can be facilitated and cost can be reduced also by the positional relationship between the two types of magnetic patterns 14 and 16 of the permanent magnet 4. Further, by adopting the above-mentioned positional relationship between the two types of magnetic patterns 14 and 16 of the permanent magnet, for example, compared with a case in which both the first magnetic pattern 14 and the second magnetic pattern 16 are formed on the outer peripheral surface of the permanent magnet 4, a thinner permanent magnet can be realized so that the entire encoder device 1 can be downsized. In addition, the positional relationship, in which the first magnetic sensor 5 arranged to be opposed to the first magnetic pattern 14 can be received by the recess 13 of the permanent magnet 4 when the permanent magnet 4 and the substrate 8 become close to each other, also contributes to downsizing the encoder device 1.

In addition, as described above, even if the permanent magnet 4 fixed to the rotation shaft 2 is shifted in the axial direction, the outputs of the first and second magnetic sensors 5 and 6 are not significantly affected. Therefore, it is not necessary to strictly align the permanent magnet 4 and the first and second magnetic sensors 5 and 6. In addition, adjustment of the positional relationship between the permanent magnet 4 and the first and second magnetic sensors 5 and 6 can be performed by adjusting the distance between the permanent magnet 4 and the single substrate 8a having the sensors 5 and 6 fixed thereto, by adjusting the thickness of the permanent magnet 4, or by adjusting both. Therefore, it is not necessary to change fixing positions of the first and second magnetic sensors 5 and 6 on the single substrate 8a for the adjustment of the positional relationship, and hence the assembling work can be further facilitated.

Further, when the first and second magnetic sensors 5 and 6 are mounted to the single substrate 8, it is not necessary to adjust the positions of the magnetic sensors by, for example, arranging another support member between the substrate 8 and the magnetic sensors 5 and 6. When adjusting the positional relationship between the permanent magnet 4 and the first and second magnetic sensors 5 and 6, the distance between the permanent magnet 4 and the single substrate 8, or the thickness of the permanent magnet 4 only needs to be adjusted as described above. In this way, because the magnetic sensors 5 and 6 only need to be fixed to the substrate 8 directly without intermediation of another member, surface mounting components such as a small outline package (SOP) or a lead-less package can be mechanically mounted on the same plane 8a of the substrate 8 by a mounting machine (mounter).

In this way, the encoder device 1 is an absolute encoder device that can be readily assembled and manufactured at low cost while maintaining high resolution and high accuracy.

Figure 15:
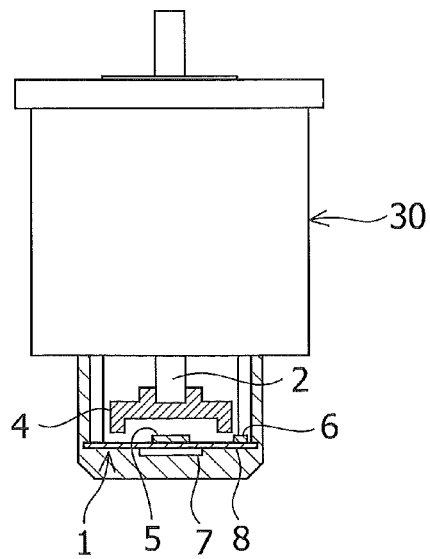
FIG. 15 is a configuration diagram of a motor to which the absolute encoder device according to the first embodiment is mounted.

Structures of the motor and the encoder device 1 in a case in which the rotation shaft 2 in the first embodiment is a drive mechanism of the motor are illustrated in FIG. 15. As illustrated in FIG. 15, by assembling the encoder device 1 to the rotation shaft 2 of a motor 30, it is possible to realize a motor with a compact absolute encoder device that can detect a rotation speed of the motor and a rotation shaft position.

Second Embodiment

Figure 16:
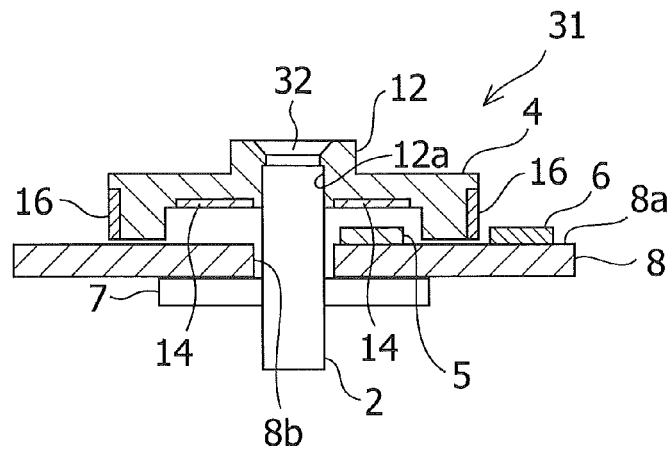
FIG. 16 is a cross-sectional view of an absolute encoder device according to a second embodiment of the present invention.
Figure 17:
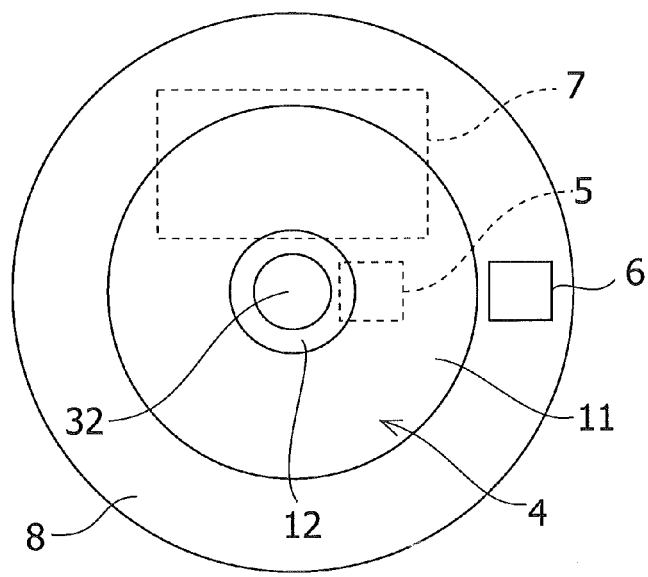
FIG. 17 is a plan view of the absolute encoder device illustrated in FIG. 16.

FIG. 16 is a cross-sectional view of an absolute encoder device according to a second embodiment of the present invention, and FIG. 17 is a plan view of the encoder device illustrated in FIG. 16 as viewed from above. In an encoder device 31 illustrated in FIGS. 16 and 17, a component corresponding to the component of the encoder device 1 of the first embodiment is denoted by the same reference symbol as in the first embodiment. The encoder device 31 according to the second embodiment has a structure different from that of the encoder device 1 according to the first embodiment in that the rotation shaft 2 penetrates the substrate 8. The distal end of the rotation shaft 2 passes through a through hole 8b formed at a center of the substrate 8 and is inserted into a through hole 12a formed in the rotation shaft fixing portion 12 from inside of the permanent magnet 4 so as to be fixed to the permanent magnet 4 with a screw 32.

Figure 18:
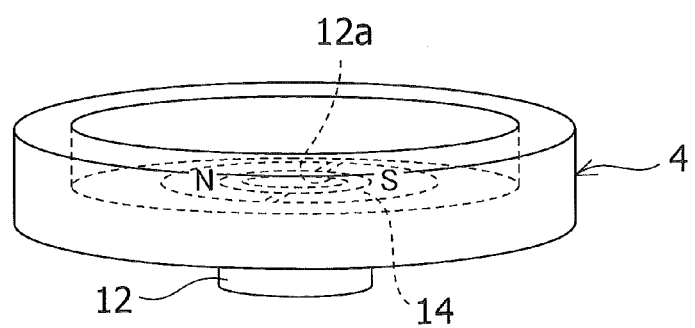
FIG. 18 is a perspective view of a permanent magnet, for illustrating a first magnetic pattern according to the second embodiment.

A configuration of the first magnetic pattern 14 of the encoder device 31 is illustrated in FIG. 18. The first magnetic pattern 14 is formed into a ring shape along the through hole 12a in which the rotation shaft 2 is inserted. As illustrated in FIGS. 16 and 17, the first magnetic sensor 5 is arranged at a position offset from an axis of the rotation shaft 2 so as to avoid the through hole 12a. FIG. 19(a) illustrates a magnetic field in a case in which a magnetized surface of the first magnetic pattern has a circular shape, and FIG. 19(b) illustrates a magnetic field in a case in which the magnetized surface of the first magnetic pattern has a ring shape. As illustrated in FIG. 19, a horizontal magnetic field necessary for the first magnetic sensor 5 to sense the magnetic field extends to outside of the magnetized pattern. Therefore, even if the first magnetic sensor 5 is arranged at a position offset from the axis of the rotation shaft 2, the output of the first magnetic sensor 5 is not significantly affected.

The encoder device 31 according to the second embodiment has the same configuration as the encoder device 1 according to the first embodiment except for the configuration in which the rotation shaft 2 penetrates the substrate 8 and the inside of the permanent magnet 4. Therefore, the encoder device 31 according to the second embodiment has an advantage that is the same as the above-mentioned advantage of the encoder device 1 according to the first embodiment.

Other Embodiments

Although the embodiments of the present invention are described above, the present invention is not limited to the embodiments described above and can be modified and changed variously based on the technical ideas of the present invention. For instance, extending directions of the magnetoresistive elements 21 and 22 (see FIG. 7) of each of the elements 6a to 6d (see FIG. 10) constituting the second magnetic sensor 6 may be set as illustrated in FIG. 20(a). In the element illustrated in FIG. 20(a), a magnetoresistive element 41 (having the resistance value R1) and a magnetoresistive element 42 (having the resistance value R2) each extend with an angle of approximately 45 degrees with respect to a virtual center line CL, and an end of the magnetoresistive element 42 is connected to an electrode 43. An equivalent circuit corresponding to the element configuration illustrated in FIG. 20(a) is illustrated in FIG. 20(b). Because the extending directions of the magnetoresistive element 41 and the magnetoresistive element 42 are different by approximately 90 degrees, similarly to the element illustrated in FIG. 7(a), sine wave signals having different phases by 90 degrees are output also from the element illustrated in FIG. 20(a). FIG. 21 illustrates a configuration of a second magnetic sensor 46 formed of four elements (46a to 46d) illustrated in FIG. 20. Positions of the elements 46a to 46d are the same as the positions of the elements 6a to 6d illustrated in FIG. 10.

Figure 22A:
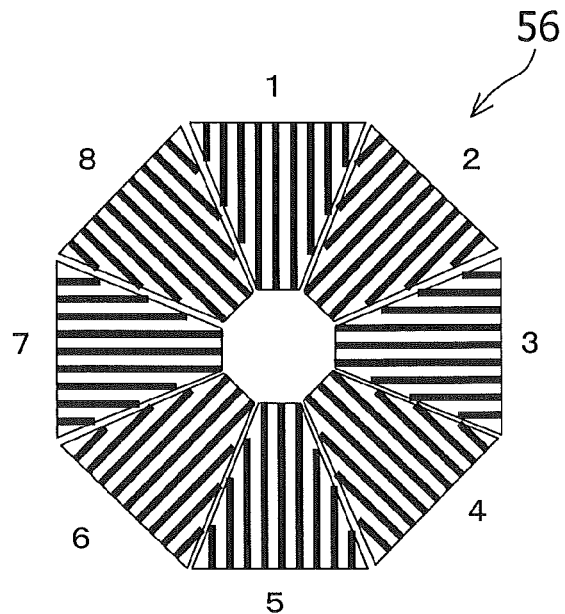
FIG. 22(a) is a structural diagram of a second magnetic sensor according to still another embodiment of the present invention.
Figure 22B:
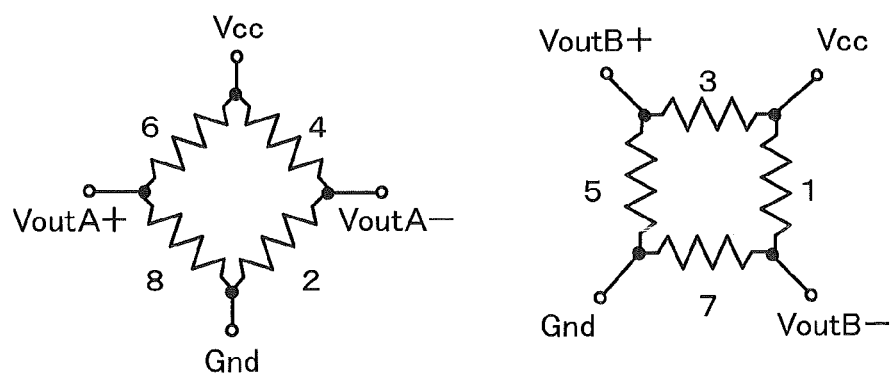
FIG. 22(b) is an equivalent circuit diagram of the structure illustrated in FIG. 22(a).

In addition, as the second magnetic sensor, it is possible to use a second magnetic sensor 56 illustrated in FIG. 22. A structure of the second magnetic sensor 56 is illustrated in FIG. 22(a), and an equivalent circuit thereof is illustrated in FIG. 22(b). The second magnetic sensor 56 includes eight magnetoresistive elements arranged with intervals of 45 degrees, which deliver outputs having different phases, as illustrated in FIG. 22(a), and includes two full bridge circuits each including four magnetoresistive elements as illustrated in FIG. 22(b). In the element identified by an odd number illustrated in FIG. 22(a), cosine outputs are obtained from third and fifth elements having extending directions different from each other by 90 degrees. Similarly, negative cosine outputs are obtained from first and seventh elements having extending directions different from each other by 90 degrees. A sensor group of four elements identified by even numbers is arranged at a position at which the entire sensor group is rotated by 45 degrees from a position of a sensor group of the four elements identified by the odd numbers. Therefore, sine outputs can be obtained from sixth and eighth elements having extending directions different from each other by 90 degrees. Similarly, negative sine outputs can be obtained from second and fourth elements having extending directions different from each other by 90 degrees. Therefore, an output of a first full bridge circuit formed of the elements identified by the even numbers of 2, 4, 6, and 8 illustrated in FIG. 22(b) and an output of a second full bridge circuit formed of the elements identified by the odd numbers of 1, 3, 5, and 7 have phases different from each other by 90 degrees, and hence, when the second magnetic pattern 16 rotates, similarly to the second magnetic sensor 6, two-phase sine wave signals having phases different from each other by 90 degrees are output from the second magnetic sensor 56.

In the second magnetic sensor 56, the magnetoresistive elements are arranged independently of the pitch (P) of the second magnetic pattern 16. Therefore, the second magnetic sensor 56 has an advantage that the second magnetic sensor 56 can be applied also to the second magnetic pattern 16 having a different pitch (P).

Next, the first magnetic sensor 5 according to other embodiments of the present invention is described. As to the first magnetic sensor 5, the magnetization directions m5 to m8 illustrated in FIG. 5(a) may be different from the directions illustrated in FIG. 5(a) by 180 degrees. The magnetization directions m1 to m4 may be different from the directions illustrated in FIG. 5(a) by 180 degrees. All the magnetization directions m1 to m8 may be different from the directions illustrated in FIG. 5(a) by 180 degrees.

In addition, as the first magnetic sensor, an AMR type magnetic sensor 25 with a bias magnet may be used. FIG. 23(a) is a structural diagram of the AMR type magnetic sensor 25, for illustrating the magnetic sensing surface areas (e1 to e8) of the AMR and the magnetization directions (m1 to m4) of the bias magnet, and FIG. 23(b) is a diagram illustrating an equivalent circuit thereof. A group formed of the magnetic sensing surface areas e1 and e2, a group formed of the magnetic sensing surface areas e5 and e6, a group formed of the magnetic sensing surface areas e3 and e4, and a group formed of the magnetic sensing surface areas e7 and e8 are arranged at an interval of 90 degrees on the same circumference as illustrated in FIG. 23(a). This AMR type magnetic sensor 25 uses different magnetization directions extending radially from a center of a magnetic pole surface of one bias magnet. Similarly to the first magnetic sensor 5, the first magnetic sensor 25 can also provide signals having different phases for discriminating N and S poles in the same period as the magnetic field period.

Figure 24A:
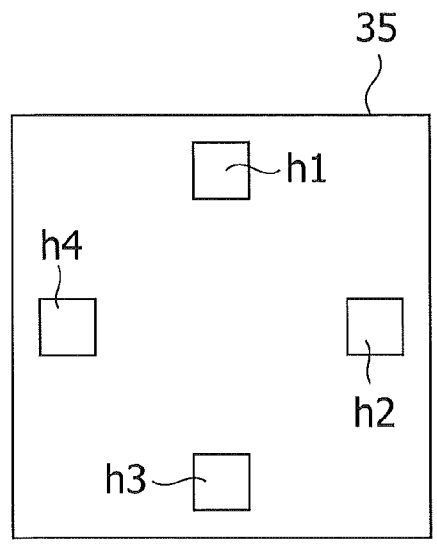
FIG. 24(a) is a structural diagram of a first magnetic sensor according to a further embodiment of the present invention.
Figure 24B:
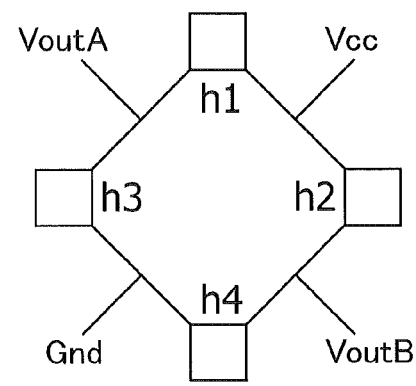
FIG. 24(b) is a circuit diagram of the sensor illustrated in FIG. 24(a).

The above-mentioned first magnetic sensors 5 and 25 are formed of the magnetoresistive element, but the first magnetic sensor may be formed of a Hall element. For instance, as illustrated in FIG. 24(a), four Hall elements h1 to h4 are arranged on the same circumference at an interval of 90 degrees so as to constitute a first magnetic sensor 35. FIG. 24(b) is a circuit diagram of the first magnetic sensor 35 illustrated in FIG. 24(a). The first magnetic sensor 35 can also provide signals having different phases for discriminating N and S poles in the same period as the magnetic field period.

Figure 25:
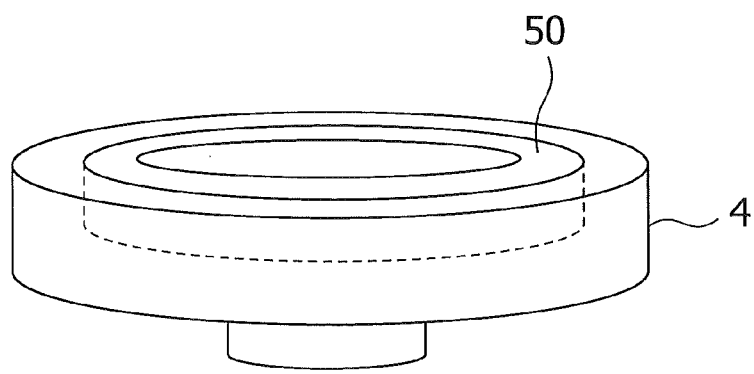
FIG. 25 is a perspective view of a permanent magnet according to a further embodiment of the present invention.

Next, the permanent magnet 4 according to another embodiment of the present invention is illustrated in FIG. 25. The permanent magnet 4 illustrated in FIG. 25 includes a ring-shaped magnetic member 50 fixed to an inner surface of the cup shape. Because this magnetic member 50 is arranged, the permanent magnet 4 has a structure that is resistant to an external floating magnetic field.

Figure 26:
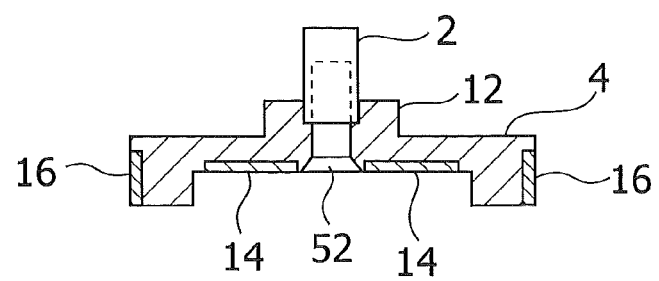
FIG. 26 is a cross-sectional view of the permanent magnet, for illustrating another method of fixing the rotation shaft and the permanent magnet.

In addition, another method of fixing the permanent magnet 4 and the rotation shaft 2 is illustrated in FIG. 26. As illustrated in FIG. 26, in the permanent magnet 4 according to the first embodiment, it is possible to form a screw hole at a center thereof and to fix the rotation shaft 2 from inside of the cup shape of the permanent magnet 4 with a screw 52.

The invention claimed is:

1. An absolute encoder device comprising:
    a permanent magnet fixed to a rotation shaft, including a first magnetic pattern formed of two poles and a second magnetic pattern formed of a plurality of poles;
    a first magnetic sensor for detecting a magnetic field of the first magnetic pattern;
    a second magnetic sensor for detecting a magnetic field of the second magnetic pattern;
    a signal processing circuit for obtaining an absolute angle signal indicating an absolute angle position of the rotation shaft based on an output signal of the first magnetic sensor, obtaining a relative angle signal indicating a relative angle position of the rotation shaft based on an output signal of the second magnetic sensor, and calculating an absolute rotation angle of the rotation shaft based on the absolute angle signal and the relative angle signal; and
    a single substrate arranged to be opposed to the permanent magnet so as to fix the first magnetic sensor, the second magnetic sensor, and the signal processing circuit,
    wherein the first magnetic pattern is formed to have different magnetic polarities along a rotation direction on a plane extending in a direction crossing an axial direction inside a recess formed in a surface of the permanent magnet opposed to the single substrate, and the second magnetic pattern is formed to have different magnetic polarities alternately along a circumferential direction on an outer peripheral surface of the permanent magnet,
    wherein the single substrate has a flat plane extending in one direction, and the first magnetic sensor and the second magnetic sensor are surface mounting components mounted directly on the same plane, and
    wherein the first magnetic sensor is received within the recess formed in the surface of the permanent magnet.

2. An absolute encoder device according to claim 1, wherein:
    the first magnetic sensor is configured to output signals having different phases in a period that permits an N pole and an S pole to be discriminated;
    the second magnetic sensor is configured to output signals having different phases in a period for not discriminating the N pole and the S pole; and
    a distance between the permanent magnet and the single substrate, and a thickness of the permanent magnet, are selected in accordance with characteristics of the first magnetic sensor and the second magnetic sensor.

3. An absolute encoder device according to claim 1, wherein the first magnetic pattern is formed into a circular shape, and the first magnetic sensor is arranged on an axis of the rotation shaft.

4. An absolute encoder device according to claim 1, wherein the first magnetic pattern is formed into a ring shape, and the first magnetic sensor is arranged at a position offset from an axis of the rotation shaft.

5. An absolute encoder device according to claim 1, further comprising a ring-shaped magnetic member arranged inside the permanent magnet.

6. A motor, comprising the absolute encoder device according to claim 1, in which the rotation shaft comprises a drive mechanism of the motor.

7. A motor, comprising the absolute encoder device according to claim 2, in which the rotation shaft comprises a drive mechanism of the motor.

8. A motor, comprising the absolute encoder device according to claim 5, in which the rotation shaft comprises a drive mechanism of the motor.

9. An absolute encoder device according to claim 1, wherein the first magnetic pattern and the second magnetic pattern are formed by surface magnetization.

* * * * *